United States Patent
Schulman et al.

(10) Patent No.: US 10,419,452 B2
(45) Date of Patent: Sep. 17, 2019

(54) CONTEXTUAL MONITORING AND TRACKING OF SSH SESSIONS

(71) Applicant: SAP SE, Walldorf (DE)

(72) Inventors: Elad Schulman, Petah Tikvah (IL); Amidan Tabak, Rosh Haayin (IL); Ofer Rivlin, Tel Aviv (IL)

(73) Assignee: SAP SE, Walldorf (DE)

( * ) Notice: Subject to any disclaimer, the term of this patent is extended or adjusted under 35 U.S.C. 154(b) by 790 days.

(21) Appl. No.: 14/981,240

(22) Filed: Dec. 28, 2015

(65) Prior Publication Data
US 2017/0034192 A1 Feb. 2, 2017

Related U.S. Application Data

(60) Provisional application No. 62/198,075, filed on Jul. 28, 2015.

(51) Int. Cl.
*H04L 29/06* (2006.01)
*G06N 20/00* (2019.01)
*H04L 12/26* (2006.01)
*G06N 3/00* (2006.01)

(52) U.S. Cl.
CPC ......... *H04L 63/1416* (2013.01); *G06N 3/006* (2013.01); *G06N 20/00* (2019.01); *H04L 43/04* (2013.01); *H04L 63/168* (2013.01)

(58) Field of Classification Search
CPC ... H04L 63/1416; H04L 63/168; H04L 43/04; G06N 99/005; G06N 20/00; G06N 3/006
See application file for complete search history.

(56) References Cited

U.S. PATENT DOCUMENTS

| | | | |
|---|---|---|---|
| 7,089,592 B2 | 8/2006 | Adjaoute et al. | |
| 7,386,889 B2 | 6/2008 | Shay et al. | |
| 7,747,730 B1 | 6/2010 | Harlow et al. | |
| 7,805,509 B2 | 9/2010 | Alon et al. | |
| 7,809,826 B1 * | 10/2010 | Guruswamy | ......... H04L 43/026 709/224 |
| 8,214,495 B2 | 7/2012 | Alon et al. | |
| 8,776,180 B2 | 7/2014 | Kumar et al. | |
| 8,826,441 B2 | 9/2014 | Mahaffey et al. | |
| 9,043,905 B1 | 5/2015 | Allen et al. | |

(Continued)

FOREIGN PATENT DOCUMENTS

WO  WO 2012095839 A2  7/2012  ............. G06F 17/30

OTHER PUBLICATIONS

Http://www.securityfocus.com/bid/2347/discuss; SSH CRC-32 Compensation Attack Detector Vulnerability, 2010.

(Continued)

*Primary Examiner* — Sarah Su
(74) *Attorney, Agent, or Firm* — Fish & Richardson P.C.

(57) ABSTRACT

An SSH module is executed as part of a host computing machine, where code for an secure shell (SSH) agent is integrated with code of the SSH module. Incoming and outgoing host computing machine transactions are collected using the SSH agent which transmits the collected host computing machine transactions to an SSH context agent external to the SSH module. The collected host machine transactions are transmitted to a monitoring server for anomalous transaction detection. The monitoring server returns instructions to perform an action based on an anomalous transaction detection.

21 Claims, 12 Drawing Sheets

(56) References Cited

U.S. PATENT DOCUMENTS

| | | | |
|---|---|---|---|
| 9,111,029 | B2 | 8/2015 | Chagoly et al. |
| 9,268,945 | B2 | 2/2016 | Williams et al. |
| 9,300,523 | B2 | 3/2016 | Alon et al. |
| 10,015,178 | B2* | 7/2018 | Schulman ............ H04L 63/1416 |
| 2006/0028689 | A1* | 2/2006 | Perry ................. H04N 1/32144 |
| | | | 358/3.28 |
| 2007/0058551 | A1 | 3/2007 | Brusotti et al. |
| 2007/0143851 | A1 | 6/2007 | Nicodemus et al. |
| 2007/0195753 | A1 | 8/2007 | Judge et al. |
| 2007/0208822 | A1 | 9/2007 | Wang et al. |
| 2007/0294369 | A1 | 12/2007 | Ginter et al. |
| 2008/0168099 | A1* | 7/2008 | Skaf ....................... G06Q 30/02 |
| 2008/0175226 | A1 | 7/2008 | Alperovitch et al. |
| 2009/0178139 | A1 | 7/2009 | Stute et al. |
| 2011/0238979 | A1 | 9/2011 | Harp et al. |
| 2012/0124368 | A1* | 5/2012 | Driessen ................ G09C 5/00 |
| | | | 713/153 |
| 2013/0139271 | A1 | 5/2013 | Arrelid et al. |
| 2013/0298244 | A1 | 11/2013 | Kumar et al. |
| 2014/0059525 | A1 | 2/2014 | Jawa et al. |
| 2015/0067139 | A1* | 3/2015 | Malnati ................. H04L 43/04 |
| | | | 709/224 |
| 2015/0095333 | A1* | 4/2015 | Porpora ............ G06F 17/30699 |
| | | | 707/737 |
| 2015/0120905 | A1 | 4/2015 | Leogrande et al. |
| 2015/0128205 | A1* | 5/2015 | Mahaffey ................ H04L 63/20 |
| | | | 726/1 |
| 2015/0326586 | A1 | 11/2015 | Khesin et al. |
| 2016/0129787 | A1 | 5/2016 | Netzer |
| 2016/0241574 | A1* | 8/2016 | Kumar .................... H04L 63/12 |
| 2016/0328247 | A1 | 11/2016 | Uriel et al. |
| 2016/0350673 | A1* | 12/2016 | Kumar ................ G06N 99/005 |
| 2016/0379136 | A1* | 12/2016 | Chen ..................... G06F 21/552 |
| | | | 706/12 |
| 2017/0006135 | A1* | 1/2017 | Siebel .................... H04L 67/02 |
| 2017/0034193 | A1 | 2/2017 | Schulman et al. |
| 2017/0187743 | A1 | 6/2017 | Madou et al. |
| 2017/0223043 | A1 | 8/2017 | Munoz et al. |
| 2018/0121309 | A1* | 5/2018 | Tabak ................. G06F 11/3414 |
| 2018/0302421 | A1* | 10/2018 | Schulman ........... H04L 63/1416 |

OTHER PUBLICATIONS

Http://www.kb.cert.org/vuls/id/684820; Vulnerability Note VU#684820, SSH-1 allows client authentication to be forwarded by a malicious server to another server, Oct. 929, 2001. pp. 1-3.

Honeypot (computing), https://en.wikipedia.org/w/index.php?title=Honeypot_(computing)&oldid=723176502 (last visited Jun. 10, 2016).

SANS Information Security Resources; IDFAQ: What is a Honeypot?; https://www.sans.org/security-resources/idfaq/what-is-a-honeypot/ 1/9 (last visited Jun. 10, 2016).

Database Trends and Applications: OpTier Launches Transaction Monitoring Tool; http://www.dbta.com/Editorial/News-Flashes/OpTier-Launches-Transaction-Monitoring-Tool-56622.aspx (last visited Jun. 10, 2016).

YouTube Video entitled: OpTier APM v5.0 Demonstration—Business Transaction Management & Dynamic Deep-Dive Diagnostics; https://www.youtube.com/watch?v=JCDyF_OMV4s ; (last visited Jun. 10, 2016).

Azoff, Michael, OVUM Solution Guide: Application Performance Management (OI00127-071, Pub. Jul. 2012; 57 pages; http://www.ca.com/~/media/Files/IndustryAnalystReports/ovum-application-performance-management.pdf ; (last visited Jun. 10, 2016).

* cited by examiner

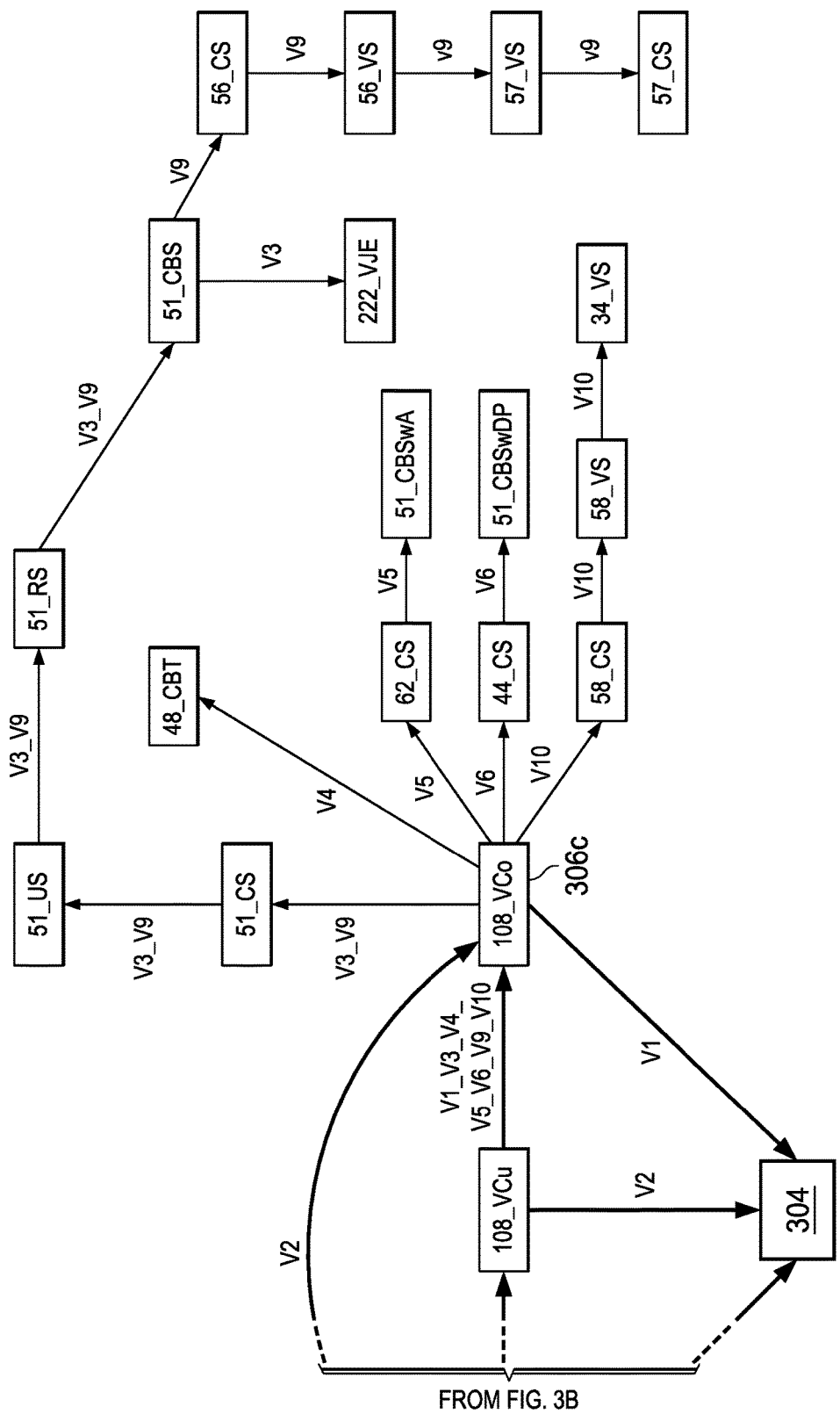

CONTEXTUAL MONITORING AND TRACKING OF SSH SESSIONS

CLAIM OF PRIORITY

This application claims the benefit of priority under 35 USC § 119(e) to U.S. Provisional Application Ser. No. 62/198,075, filed on Jul. 28, 2015, the contents of which are hereby incorporated by reference for any purpose.

CROSS-REFERENCE TO RELATED APPLICATIONS

This application is a co-pending application of U.S. application Ser. No. 14/981,261 filed on Dec. 28, 2015 entitled "REAL-TIME CONTEXTUAL MONITORING INTRUSION DETECTION AND PREVENTION"; the entire contents of which is incorporated herein by reference for any purpose.

BACKGROUND

System/application providers are increasingly being held liable for exploited potential security vulnerabilities in systems/applications. The exploits can result in, among other things, theft/loss of data, release of confidential/secure data, exposure of personally identifiable information (PII), use of a system/application to further additional malicious activities, and damage to the reputation or business of the system/application provider and or entities (e.g., an individual, business organization, religious organization, team, club, and the like) connected with affected data. A growing problem is the exploitation of systems/applications by an "insider" to an entity; that is a member of an entity considered a trusted individual with varying degrees of authority/privilege over particular systems/applications (e.g., with valid credentials) or someone impersonating a trusted individual (e.g., with stolen or faked credentials). The insider can use their credentials to perform malicious acts in the system/application at varying levels (e.g., higher-level transactions or lower-level session-based activities) and can be very hard to detect as the credentials used are (or appear to be) valid under normal security reviews.

SUMMARY

The present disclosure relates to computer-implemented methods, computer-readable media, and computer systems for real-time contextual monitoring intrusion detection and prevention.

Implementation of the described subject matter can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

In a first implementation, a configuration is received for an agent associated with an application to monitor application transactions. The agent monitors incoming and outgoing application transactions using the agent and transmits monitored transaction data to a monitoring server for anomalous transaction detection. The agent receives instructions from the monitoring server to perform an action based on the transmitted monitored transaction data and reports the status of the performed action to the monitoring server.

One design-time computer-implemented method of the first implementation includes receiving a configuration, the configuration for an agent associated with an application to monitor application transactions; monitoring incoming and outgoing application transactions using the agent; transmitting monitored transaction data to a monitoring server for anomalous transaction detection; receiving instructions from the monitoring server to perform an action based on the transmitted monitored transaction data; and performing an action based on the received instructions.

The first implementation, and other implementations consistent with this disclosure, can each optionally include one or more of the following features, alone or in combination:

A first aspect, combinable with the general implementation, wherein agent code is inserted and compiled into the application code as part of the application.

A second aspect, combinable with the general implementation, wherein the configuration of the agent can be dynamically updated during agent runtime.

A third aspect, combinable with the general implementation, wherein the agent can be dynamically replaced or supplemented with a different agent with differing capabilities during runtime.

A fourth aspect, combinable with the general implementation, comprising detecting an anomalous transaction in the monitored application transactions.

A fifth aspect, combinable with the general implementation, wherein the transactions are performed using the secure shell (SSH) protocol.

A sixth aspect, combinable with the general implementation, wherein the anomalous transaction detection is performed using a learning machine using behavior models continuously updated by learning machine determinations.

In a second implementation, an SSH module is executed as part of a host computing machine, where code for an secure shell (SSH) agent is integrated with code of the SSH module. Incoming and outgoing host computing machine transactions are collected using the SSH agent which transmits the collected host computing machine transactions to an SSH context agent external to the SSH module. The collected host machine transactions are transmitted to a monitoring server for anomalous transaction detection. The monitoring server returns instructions to perform an action based on an anomalous transaction detection.

One design-time computer-implemented method of the second implementation includes executing an SSH module as part of a host computing machine, wherein code for an secure shell (SSH) agent is integrated with code of the SSH module; collecting incoming and outgoing host computing machine transactions using the SSH agent; transmitting the collected host computing machine transactions to an SSH context agent external to the SSH module; transmitting the collected host machine transactions received by the SSH module to a monitoring server for anomalous transaction detection; receiving instructions from the monitoring server to perform an action based on an anomalous transaction detection due to the collected host machine transactions; and performing an action based on the received instructions.

The second implementation, and other implementations consistent with this disclosure, can each optionally include one or more of the following features, alone or in combination:

A first aspect, combinable with the general implementation, comprising compiling the SSH module with the integrated code of the SSH agent.

A second aspect, combinable with the general implementation, wherein the SSH context agent performs classification of the received collected incoming and outgoing host computing machine transactions.

A third aspect, combinable with the general implementation, wherein the SSH agent is configured as to what parameters of incoming and outgoing host computing machine transactions are to be collected and reported to the SSH context agent.

A fourth aspect, combinable with the general implementation, comprising monitoring periodic handshakes between the monitoring server and the SSH agent.

A fifth aspect, combinable with the general implementation, comprising detecting an anomalous transaction in the collected host machine transactions.

A sixth aspect, combinable with the general implementation, wherein the anomalous transaction detection is performed using a learning machine using behavior models continuously updated by learning machine determinations.

The subject matter described in this specification can be implemented in particular implementations so as to realize one or more of the following advantages. First, a contextual end-to-end transaction tracking capability is used to collect and track interactions (e.g., performed by users and non-users) in a system/application typically in real-time. The data collected is analyzed to identify more risky transactions, using model-based risk analysis techniques that can, among other things, learn the behavior of users/non-users in the system, in order to learn/establish a baseline of what is expected behaviors for users/non-users. Once an anomalous transaction(s) is (are) detected (e.g., based on a comparison with learned expected behavior), active measures can be taken against the anomalous transaction(s) (e.g., block the anomalous transaction(s). For example, returning false/mock data to the user/non-user, or diverting the user/non-user into a one or more mock/demo system (e.g., "honey-pots"), in order to analyze and attempt to learn the end game of the user/non-user. Second, the identification of the anomalous transaction(s) can be performed to determine the identity/end-game of the user/non-user without exposing the fact that the user/non-user anomalous activities are being monitored and potentially managed. Third, while prior art is focused on detecting and preventing attacks at a perimeter of a system/application, monitoring network traffic, reading log files, etc. which can contain data relevant to the attack, these solutions also either correlate different data sources after the fact, or do not rely on a complete "picture" of the activities around anomalous activities. Existing solutions are also dependent on the ability to decipher network traffic, or require certain information to be written to log files (or other data sources). However, the described monitoring functionality is integrated into a system/application, seeing and monitoring everything that is happening in the system/application. The proposed system is exposed to everything a user/non-user is doing, exactly as the user/non-user experiences it, and in real-time. Fourth, the prior art is usually very specific to a particular security issue or threat; acting as a niche solution. However, the described monitoring concept is generic and not dependent on application logic, but rather the technology stack the application is written in (e.g., JAVA). Fifth, in some implementations, secure shell (SSH) sessions are used to access remote Linux/Unix machines. Malicious users logging to a remote machine can switch credentials to other user's credentials and continue working on the machine or even connect to other machines using new SSH sessions. Currently tracking those flows is limited in the sense that a SSH session is encrypted and unless the SSH module associate with the session is configured to log verbatim what native commands are transmitted using the SSH session, no one really knows what the user may be doing on the remote machine. If a malicious user switches a user id within a particular SSH session, it makes tracking and correlating the session to its original user even harder. For example, privileged users abusing their rights may actually turn off the logging facility or delete log files, making such tracking very difficult or next to impossible. In another example, correlating SSH sessions hopping between different hosts is also difficult and time consuming. While central monitoring of SSH sessions exist, the solutions typically rely on central control of the SSH session keys which can also be abused. The disclosure describes a way to monitor SSH sessions in contextual way, across user accounts and across hosts in a seamless manner that cannot (or at least it is very difficult to do so) be tampered with without the knowledge of the monitoring system. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 3A-3C are block diagrams of a flow graph of determined high-risk transaction paths associated with an example application landscape of FIGS. 1A & 1B, according to an implementation.

Like reference numbers and designations in the various drawings indicate like elements.

DETAILED DESCRIPTION

Figure 1A:
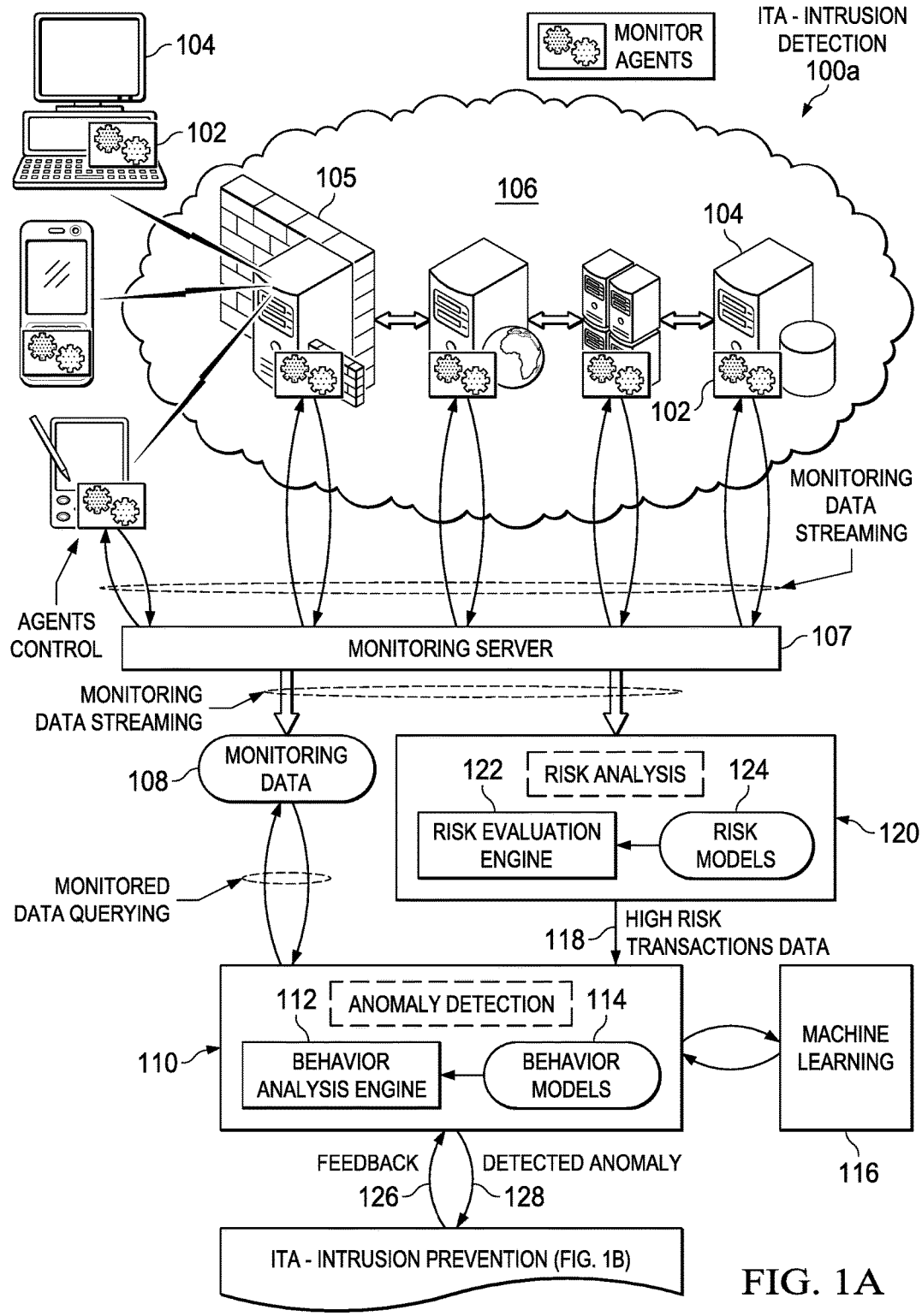
FIG. 1A is a block diagram illustrating a runtime inside threat agent (ITA) instruction detection functionality of a Contextual Monitoring Intrusion Detection System (CIDS), according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are temporally proximate such that a "user" (e.g., a person, software module, etc.) perceives the action and the response occurring substantially simultaneously. For example, the time difference for a response to display (or for an initiation of a display) of data following a user's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data. As will be apparent to those or ordinary skill in the art, any other action consistent with this disclosure that can be performed could be substituted for the example action to access data and a corresponding display (or initiation of display) of data.

System/application providers are increasingly being held liable for exploited potential security vulnerabilities in systems/applications. The exploits can result in, among other things, theft/loss of data, release of confidential/secure data, exposure of personally identifiable information (PII), use of a system/application to further additional malicious activities, and damage to the reputation or business of the system/application provider and or entities (e.g., an individual, business organization, religious organization, team, club, and the like) connected with affected data. A growing problem is the exploitation of systems/applications by an "insider" to an entity; that is a member of an entity considered a trusted individual with varying degrees of authority/privilege over particular systems/applications (e.g., with valid credentials) or someone impersonating a trusted individual (e.g., with stolen or faked credentials). The insider can use their credentials to perform malicious acts in the system/application at varying levels (e.g., higher-level transactions or lower-level session-based activities) and can be very hard to detect as the credentials used are (or appear to be) valid under normal security reviews.

The disclosure describes a contextual end-to-end transaction and a secure shell (SSH) transaction tracking capability used to collect and track interactions (e.g., performed by users and non-users in a system/application typically in real-time using "agents." In typical implementations, the agents can, among other things, monitor transactions, communicate with a monitoring server sending and receiving data, perform actions based on identifications/decisions made by the monitoring server in conjunction with a learning machine as to the existence of anomalous activities, and other actions. In the case of identification of an anomalous action, an agent can be instructed to and perform actions such as more closely monitoring transactions, performing request traces, blocking transactions, redirecting transactions (e.g., a denial of service (DoS) attack or directing a malicious user/process to a false set of data—a "honeypot"—to allow real-time study of the malicious activity in an attempt to ascertain location, user, credentials, etc.). As will be appreciated by those of ordinary skill, agents can be configured to perform a multitude of functions. The examples presented in the disclosure are not meant to limit the disclosure to only the identified capabilities, but to include other activities consistent with this disclosure.

In typical instance, Agents become an actual part of the system/application they are associated with (i.e., they are not installed as an additional application or as an additional layer or looking/monitoring an application from the outside) so agents "see" everything which is happening with the system/application because it is a part of the system/application. For example, agents can be instrumented by an application developer into actual software module code and compiled as part of the actual software module. In some implementations, an agent on an application server can inject itself into, for example, served web pages in real-time without application developer intervention. Other configurations are also possible (e.g., an agent plug in, add-in, etc.) depending on particular circumstances related to a system/application.

In some implementations, agents can be dynamically substituted with other agents based on detected anomalies, etc. For example, an application can be complied with a particular type of application that is inadequate to perform actions based on detected anomalies. In this instance, one possible course of action is to instruct a system to direct requests to an application compiled with appropriate agents that can be dynamically updated with a current configuration of the application with the inappropriate agents to allow the new application to quickly pick up with the older agent left off in handling transactions. In other instances, the software can be instrumented with appropriate application programming interfaces (APIs) to allow the agents to be dynamically substituted with respect to the running application to provide the features/functionality that the application needs based on detected anomalous activity.

The data collected is analyzed to identify more risky transactions, using model-based risk analysis techniques that can, among other things, learn the behavior of users/non-users in the system, in order to learn/establish a baseline of what is expected behaviors for users/non-users. It is to be noted that the model-based risk analysis techniques and associated machine learning can be implemented in a multitude of ways. In typical implementations, an artificial intelligence pattern matching learning machine can be used with model rules, parameters, guidelines, etc. to "train" the learning machine to detect anomalous activities based on particular user behavior to perform machine learning. In some implementations, the learning machine can be custom, open source, commercial, etc. or a mix of these or other learning machine implementations. In some implementations, multiple learning models can be created and each used, if applicable, depending on, for example, type of user, role, activity, credentials, etc.

Each monitored transaction is typically tagged by an agent and/or other element of a Contextual Monitoring Intrusion Detection System (CIDS) with additional contextual information, additional metadata (e.g., the name of the customer the name of the user, the geographical location, the browser, the device, the application it belongs to, etc.) An analytics engine aggregating and builds a data structure which allows the data structure to be sliced and diced (e.g., see discussion of user interface below) to, for example, answer questions such as which users were performing an action from a particular geography, from this browser at a specific point in time, etc.

Once an anomalous transaction(s) is (are) detected (e.g., based on a comparison with learned expected behavior), active measures can be taken against the anomalous transaction(s) (e.g., block the anomalous transaction(s). For example, returning false/mock data to the user/non-user, or diverting the user/non-user into a one or more mock/demo system (e.g., "honeypots"), in order to analyze and attempt to learn the end game of the user/non-user. Identification of anomalous transaction(s) can also be performed to determine an identity/end-game of a user/non-user without exposing the fact that the user/non-user anomalous activities are being monitored and potentially managed. In some implementations, other systems can be fed with data/instructions to trigger the other systems to perform an action based on identification/detection of anomalous activity (e.g., trigger a load balancer to act differently, push requests to a different system, etc.).

While prior art is focused on detecting and preventing attacks at a perimeter of a system/application, monitoring network traffic, reading log files, etc. which can contain data relevant to the attack, these solutions either correlate different data sources after the fact, or do not rely on a complete "picture" of the activities around anomalous activities. Existing solutions are also dependent on the ability to decipher network traffic, or require certain information to be written to log files (or other data sources). However, the described monitoring functionality is integrated into a system/application, seeing and monitoring everything that is happening in the system/application. The proposed system is exposed to everything a user/non-user is doing, exactly as the user/non-user experiences it, and in real-time.

Prior art is also usually very specific to a particular security issue or threat; acting as a niche solution. However, the described monitoring concept is generic and not dependent on particular application logic, but rather, for example, the technology stack an application is written in (e.g., JAVA, etc.).

In typical implementations, as will be understood by those of ordinary skill in the art, monitoring results, alerts, etc. can be presented to particular users in many various ways to allow the monitoring results, alerts, etc. to be understood and to be acted upon. For example, some implementations can provide a "dashboard" or other graphical user interface (GUI)-type interface to monitor anomalous activity detections, default actions taken by agents, to present options to monitoring users to perform other actions, an interface to control, query, and command particular agents to perform actions, etc. Any GUI-type interface consistent with this disclosure is considered to be within the scope of this disclosure and variations of presenting and interacting with data is not meant to limit this disclosure in any way.

FIG. 1A is a block diagram 100a illustrating a runtime inside threat agent (ITA) intrusion detection functionality of a CIDS, according to an implementation. The described ITA detection functionality is used to detect for example, cyber insider threats. As described with respect to FIG. 1B, the ITA instruction detection functionality also can work with ITA prevention functionality to enhance overall CIDS functionality.

Figure 1B:
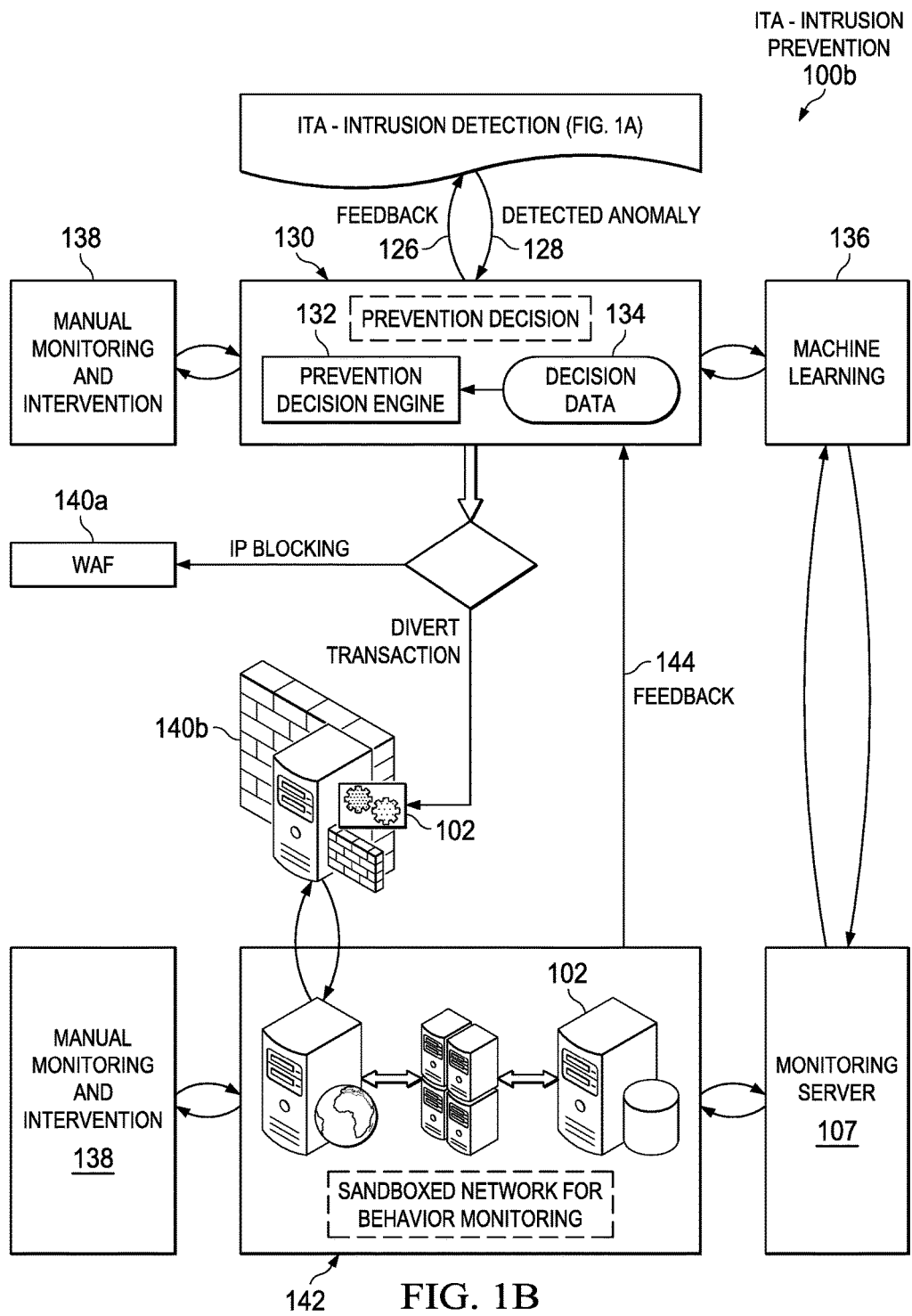
FIG. 1B is a block diagram illustrating an ITA instruction prevention functionality of the CIDS, according to an implementation.

Monitoring agents 102 perform traffic monitoring of network traffic passing through each computing node 104 in an application landscape 106 (note that not all monitoring agents 102 and computing nodes 104 are uniquely labeled in FIGS. 1A and 1B). Monitoring agents 102 can provide data for multiple dimensions of network transactions (e.g., application type, web page identification, transactions, business processes, customers, user identification, geographical location, timestamps, modules, browser type/version, computing node 104 type, etc.).

As illustrated, a computing node are both external (e.g., clients) and internal computing systems (e.g., front-facing and back-end) in relation to the application landscape 106 (illustrated in FIG. 1A as a cloud-type computing environment with a firewalled front-facing computing node 102 with a web application firewall 105). To ensure complete threat analysis capability, in typical implementations, all computing nodes associated with a particular application landscape (e.g., application landscape 106) are associated with at least one monitoring agent 102.

In typical implementations, the monitoring agents 102 can monitor the traffic passing through each node in the application landscape, perform end-to-end transactions monitoring, stream collected data to a monitoring server (e.g., monitoring server 107), accept commands from the monitoring server 107, and take active measures (e.g., upon one or more requests by the monitoring server 107), such as diverting specific network transactions, generating logs, and other active measures. Depending on the implementation, "streaming" mean either pushed and/or pulled data received by the monitoring server 107. The monitoring server 107 keeps track of received monitored network transaction data and forms complete transactions for analysis. In typical implementations, monitored network transaction data (e.g., monitoring data 108) can be stored in a persistent storage (e.g., an in-memory/conventional database or other type of storage).

The stored specific data of network transactions can be aggregated or queried on specific transactions by an anomaly detection 110 component of the CIDS. In typical implementations, the anomaly detection 110 component uses an algorithmic behavioral analysis engine 112 to detect anomalous network transaction behavior according to defined/dynamic behavior models 114. The behavior models 114 can be pre-defined and/or dynamically generated/updated over time. For example, a machine learning component 116 (e.g., artificial intelligence, artificial neural network, etc.) can be used to analyze queried monitoring data 108, high-risk transaction data 118 (e.g., filtered high-risk transaction data (risk criteria results) from a risk analysis component 120—as described below), feedback 126 from an intrusion prevention aspect of the CIDS (described with respect to FIG. 1B), and existing behavior models 114 to provide data to the behavior analysis engine 112, generate new/updated behavior models 114, and for any other purpose consistent with this disclosure. In this way, behavior models 114 can be continuously updated by machine learning 116 findings/determinations according to the configuration of the machine learning 116 component. In another example, the behavioral analysis engine 112, using the behavior models 114, can query the monitoring data 108 to determine whether any 'over time' anomalies exist in the analyzed monitoring data 108. The anomaly detection 110 component sends particular transaction data 128 of any suspected/detected anomaly to the intrusion prevention aspect of the CIDS (as described in FIG. 1B).

The risk analysis 120 component of the intrusion detection aspect of the CIDS analyzes the monitoring data from the monitoring server 107 and decides on what the focus, meaning what is more/less important to alert on. Considering the critical assets of an application, the risk analysis engine 122 of the risk analysis 120 component focuses on the critical assets rather on the less critical parts of the system. In typical implementation, only network transactions involved in high-risk areas of the application (e.g., assets, roles, etc.) as determined, for example, by risk models 124, make it past a filtering function (e.g., either inclusive or exclusive) to be evaluated by the risk evaluation engine 122. This functionality is balanced to filter out network transactions not likely to be involved in risky activity. In some implementations, the filter can be pre-defined and/or dynamically adjustable (e.g., by the machine learning 116 component and/or other components of the illustrated CIDS—whether or not illustrated). The risk analysis 120 component also provides the anomaly detection 110 component with determined risk criteria results (high risk transactions data 118). As stated above, the anomaly detection 110 component analyzes the monitoring data in light of the received risk criteria results, and uses a machine learning algorithm (here, machine learning 116), which constantly analyzes the received monitoring data 108, and learns what is a "normal" application landscape 107 behavior for one or more users. The anomaly detection 110 component can then determine "anomalous" behavior which deviates from normal behavior. This determination can be based on predefined and/or dynamically determined thresholds, patterns, or other methods. The anomaly detection component then feeds detected anomaly data and/or other data consistent with this disclosure into the intrusion prevention component (described in FIG. 1B), which determines what to do with a detected anomaly (e.g., block, collect more data, divert the user into a sandbox/"honeypot"-type computing system, etc.

Turning now to FIG. 1B, FIG. 1B is a block diagram 100b illustrating an ITA intrusion prevention functionality of the CIDS, according to an implementation. A detected anomaly received from the ITA intrusion detection of FIG. 1A is passed into the ITA intrusion prevention functionality that determines an intrusion prevention strategy for the detected anomaly and sets one or more actions into action in response to the detected anomaly. Typical actions include blocking an internet protocol (IP) address in the application landscape 107 (e.g., at the web application firewall 105 of FIG. 1A) or diverting the computing node 102 requests into a sandbox/"honeypot"-type computing environment to contain, lead-on, and gather additional information about an intruding computing node 102 and desired activities (e.g., once network traffic flow is diverted to the sandbox/honeypot-type computing system, the sandbox/honeypot-type computing system can also be monitored by the monitoring server 107 and other elements of FIGS. 1A & 1B to collect data on the intruding computing node's 102 actions).

A prevention decision 130 component is used to decide on one or more prevention patterns according to determined prevention strategy. In typical implementations, the prevention decision 130 component uses an algorithmic prevention decision engine 132 to determine an appropriate network intrusion prevention strategy according to defined/dynamic decision data 134 (one or more prevention strategies). The decision data 134 can be pre-defined and/or dynamically generated/updated over time. For example, a machine learning component 136 (e.g., artificial intelligence, artificial neural network, etc.—and in some implementations the same machine learning component as machine learning 116) can be used to analyze received detected anomalies 128 and/or manual monitoring and intervention data from a manual monitoring and intervention 138 component to provide an intrusion prevention strategy for the detected anomaly and to set one or more actions into action in response to the detected anomaly (e.g., blocking 140a an internet protocol (IP) address in the application landscape 106 at the web application firewall 105 of FIG. 1A) or diverting 140b computing node 104 requests into a sandbox/"honeypot"-type computing environment 142 (made up of one or more computing nodes 104 with realistic false data) to contain, lead-on, and gather additional information about an intruding computing node 102 and desired activities.

In typical implementations, the sandbox/"honeypot"-type computing environment 142 can execute the same target application as the application landscape 106 that is constantly and deeply monitored. In fact, the sandbox environment can be more heavily/deeply monitored than the application landscape 106 to help determine how an intruding computing node 104 is attempting to or has had accessed the application landscape 106 improperly. Any collected data (e.g., sandbox data) can be used to draw conclusions on the specific attack(s) and to develop stronger detection and prevention functionality (e.g., updated behavior models 114 and decision data 134).

If diverted, the additionally gathered data from the sandbox 142 can be used by the manual monitoring and intervention 138 component to manage the detected intruder, gather data, etc. or to provide data (through a monitor—e.g., monitoring server 107) to the machine learning 136 to update the decision data 134 or for any other purpose consistent with this disclosure. In this way, the sandbox data can be used by the machine learning 136 to continuously update the decision data 134. In some implementations, the sandbox data can also be directly provided to the prevention decision 130 component (e.g., as part of feedback 144) to be used to update the decision data 134.

The prevention decision 130 component can also sent alerts (e.g., SMS/MMS, telephone, pop-up dialogs, audio, etc.) in response to a detected network transaction anomaly. This permits the above-mentioned manual monitoring and intervention 138 component to be leveraged by a user (e.g., a network administrator or network security specialist) to analyze and make decisions as to how best to respond to and manage the detected network transaction anomaly (e.g., block the IP address, etc.).

The prevention decision 130 component also passes back the one or more determined prevention patterns and/or other data consistent with this disclosure to the ITA intrusion detection functionality of CIDS described in FIG. 1. As explained above, in typical implementations, prevention patterns can include sending requests to tools like firewalls (web application firewall 105) to block a specific IP addresses and sending request to the monitoring server 107 to divert transactions by a specific user or IP to a sandboxed network for further monitoring and analysis. The data sent to the ITA intrusion detection functionality of CIDS described in FIG. 1 allows an action to be performed immediately upon a detection of an anomalous network transaction—speeding up intrusion detection and response functionality.

Figure 2:
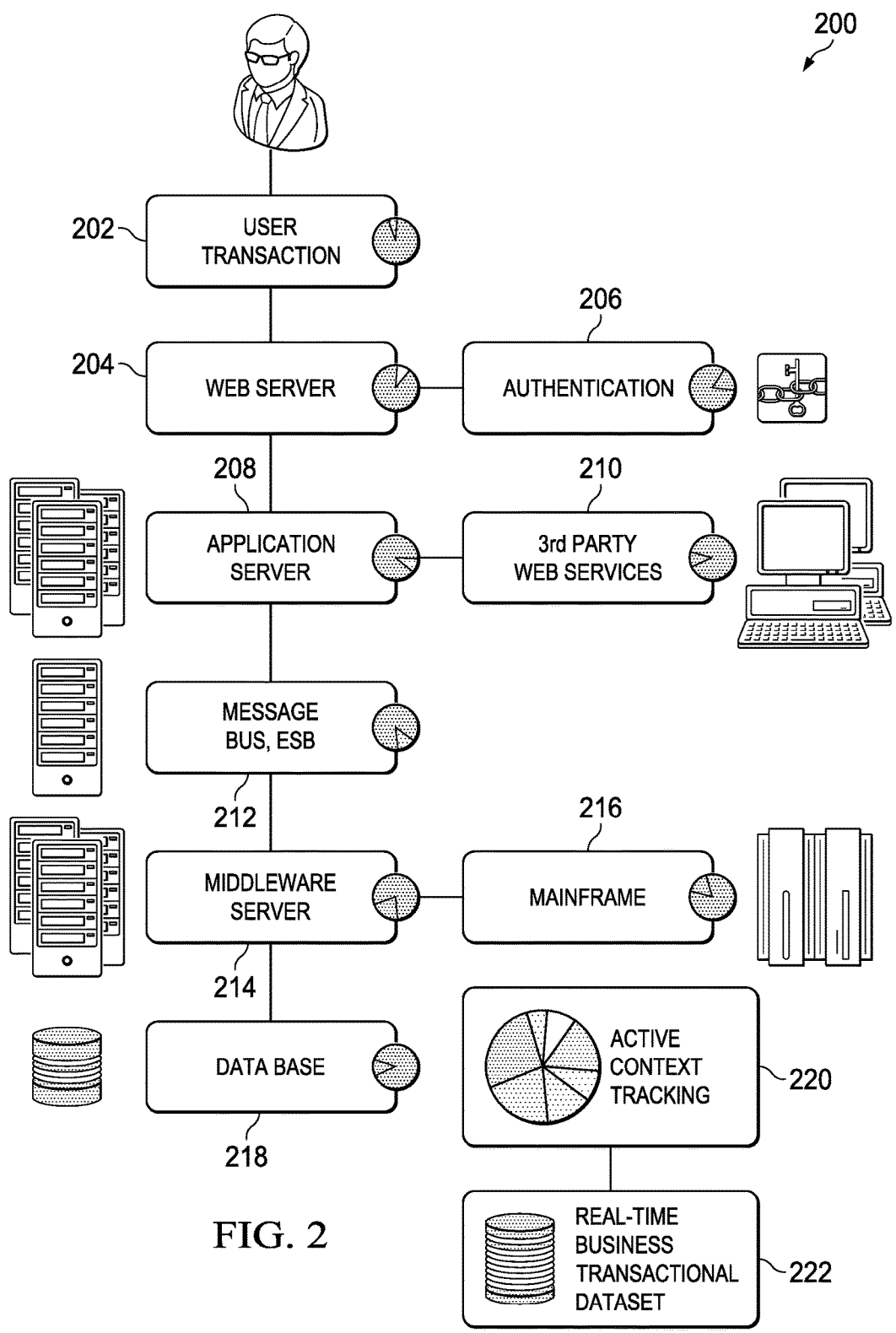
FIG. 2 is a block diagram of example components of system (e.g., application landscape 106) used to handle a request initiated by a computing node of FIGS. 1A & 1B, according to an implementation.

FIG. 2 is a block diagram of example components of system 200 (e.g., application landscape 106) used to handle a request initiated by a computing node of FIGS. 1A & 1B, according to an implementation. In typical implementations, an end user 202 initiates a transaction (e.g., a web request), for example using a computing node (e.g., computing node 104). Each transaction is uniquely tagged (e.g., a unique user/transaction ID, etc.) by a monitoring agent (e.g., monitoring agent 102) associated with the computing node. A web server 204 typically authenticates 206 the received transaction and an application server 208, in addition to its own functionality, accesses third-party web services 210 to respond to the received transaction. The transaction is then passed over a message bus 212 to a middleware server 214. The middleware server 214 can access a mainframe type computer 216 to perform various functions, obtain data, etc. The middleware server 214 can also access a database 218 to obtain necessary data to return in response to the received transaction.

The unique tagging allows useful transactional data to be collected as the transaction flows through the system architecture (e.g., the application landscape 106). Data gathered at each described step is stored in the context of the individual step and stored in an active context tracking persistence 220. Coupled with the real-time transactional dataset 222 (e.g., together, in some implementations, 220 and 222 can form monitoring data 108), the CIDS described in at least FIGS. 1A & 1B has detailed, contextual data with which to analyze using, for example, the risk analysis 120 component, the anomaly detection 110 component, and/or other components of the CIDS (whether or not illustrated) to provide, for example, the above-described real-time analytics and intrusion detection/prevention functionality and other functionality consistent with this disclosure.

FIG. 3 is a block diagram of a flow graph 300 of determined high-risk transaction paths associated with an example application landscape of FIGS. 1A & 1B, according to an implementation. For example, risk analysis 120 component of FIG. 1A can analyze received monitoring data from the monitoring server 107 as described in FIG. 1A and determine that various transactions related to a component of the example application landscape 106 (e.g., a database 304) are of higher risks than other transaction paths. As a particular example, the transaction path from the risk analysis 120 component, following the transaction path to component/application 306a, to component/application 306b (through various other components/applications), to component/application 306c, and to database 304 is considered to be high risk. In this example, a GUI can be used to display the components/applications associated with the example application landscape 106 and to indicate high-risk paths (e.g., with lines of varying color, pattern, weight, etc.).

Figure 3A:
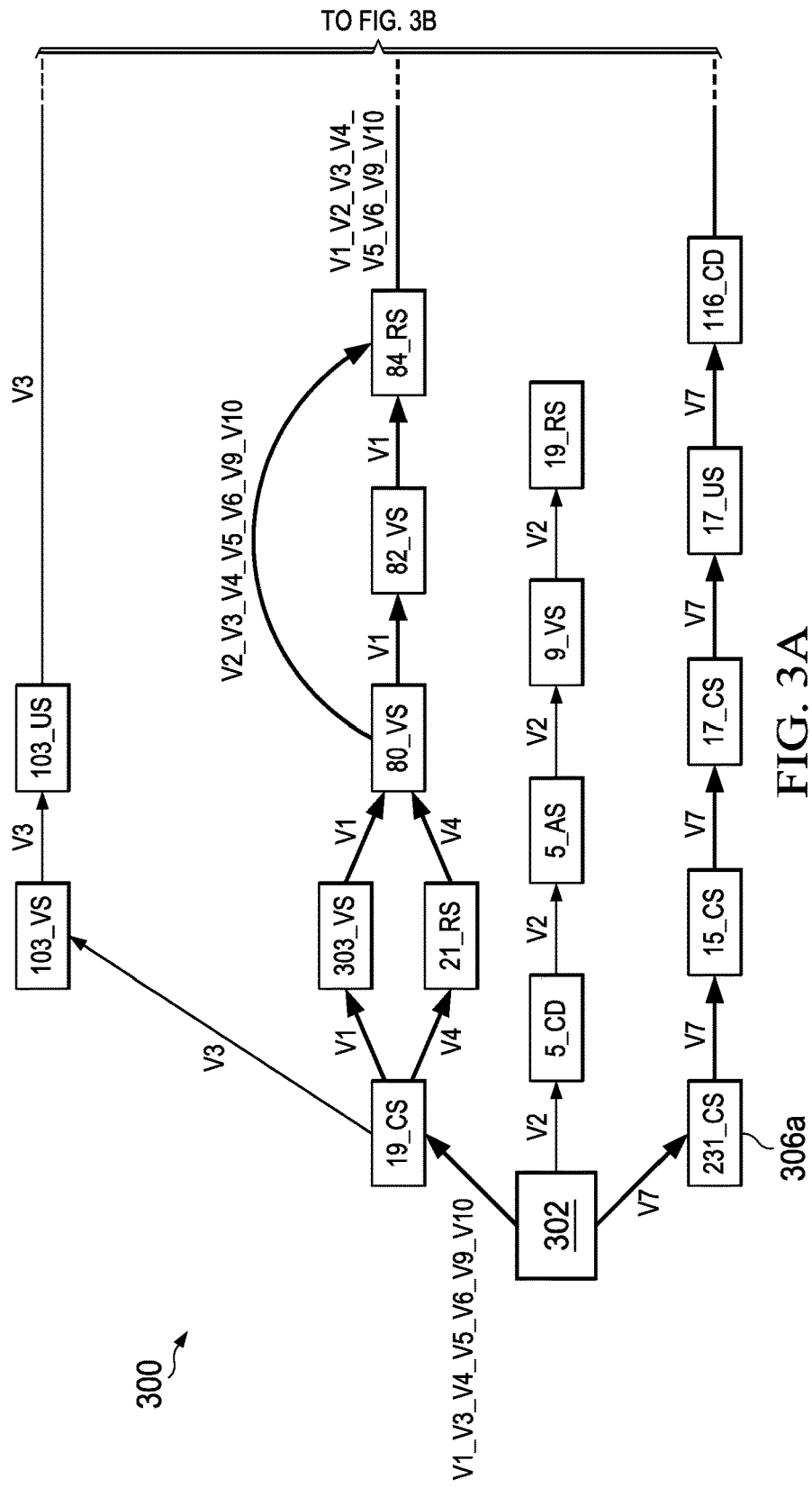
Figure 3B:
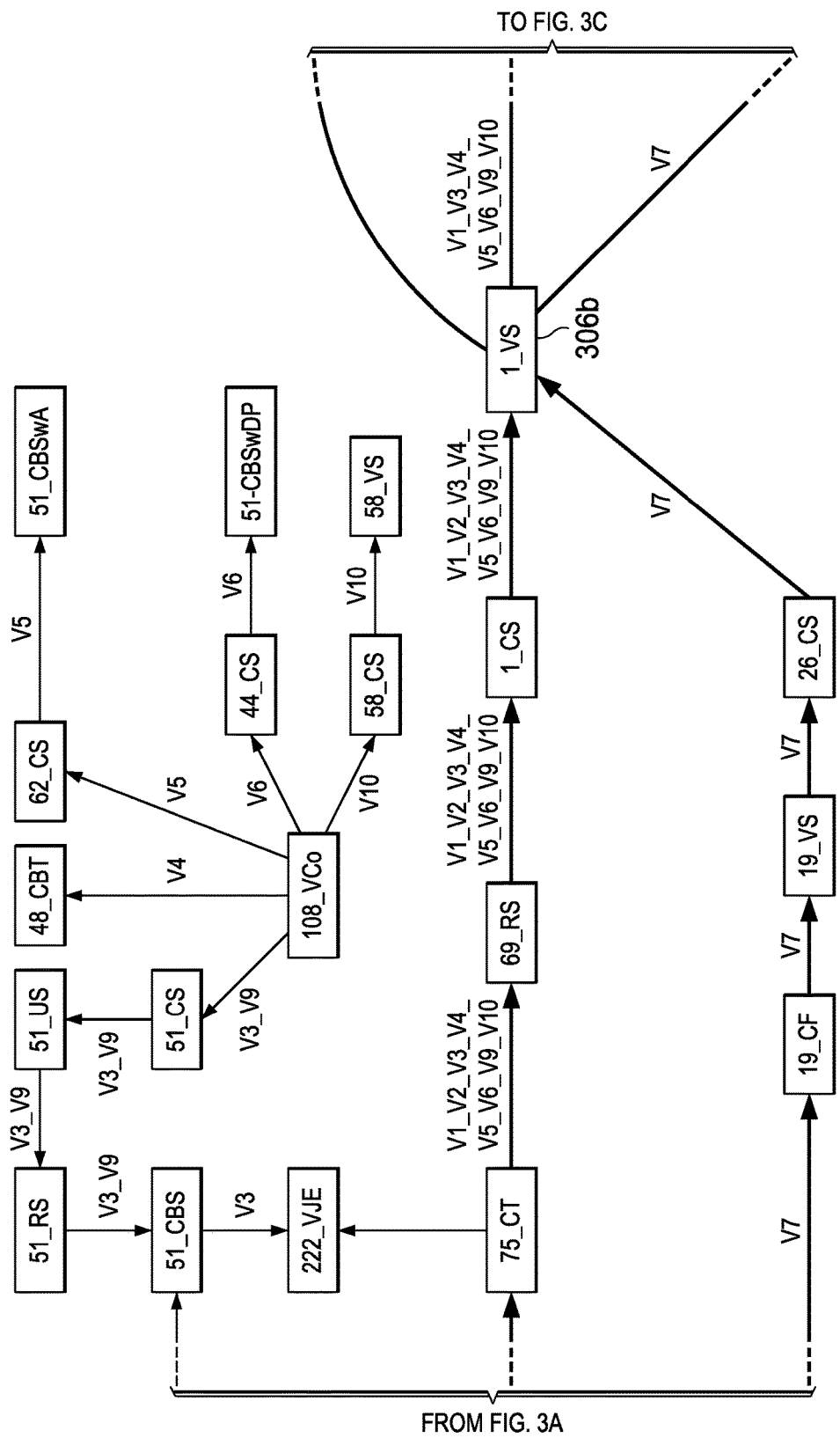
Figure 4:
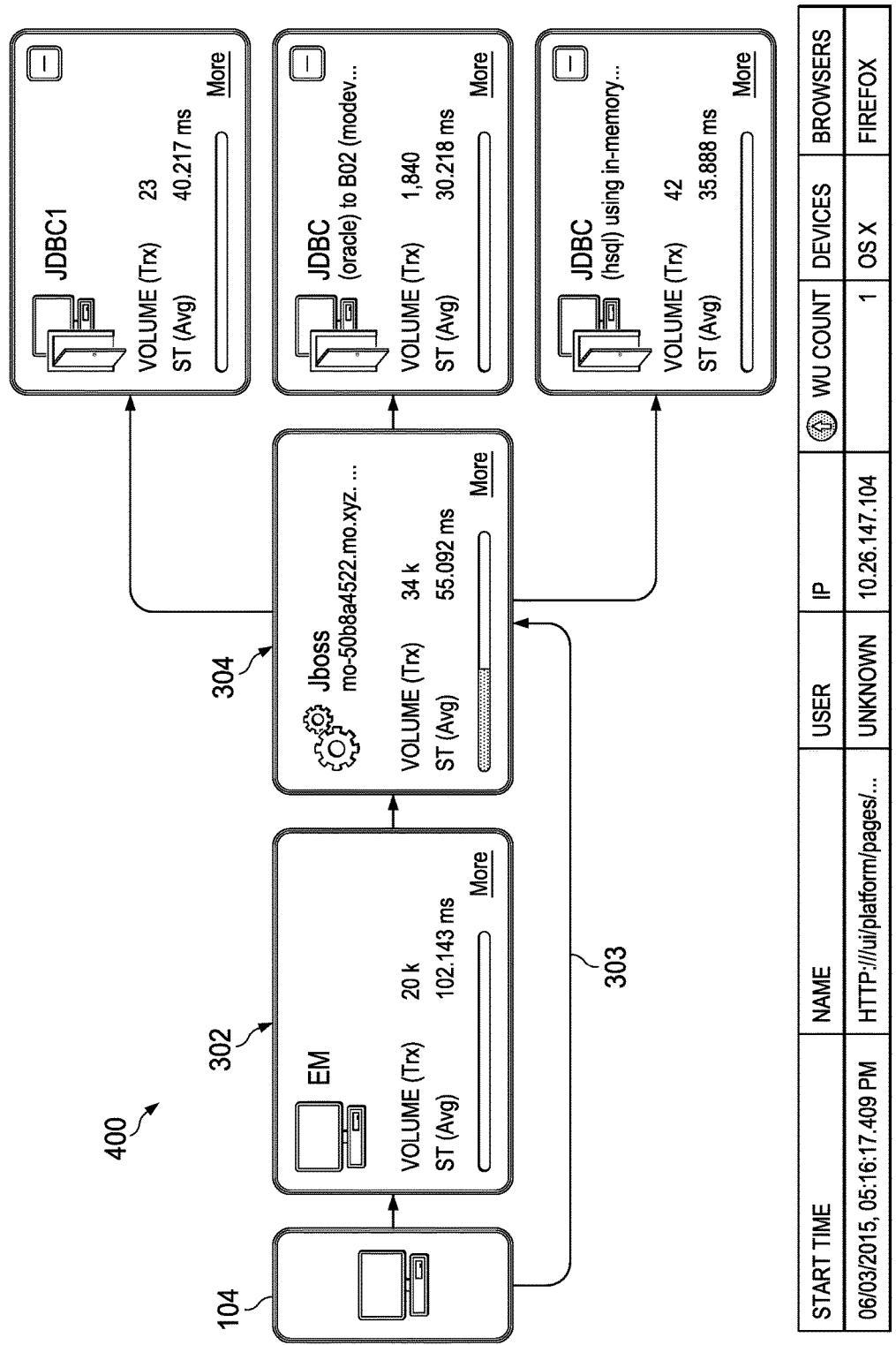
FIG. 4 is a block diagram illustrating a detected anomaly in an expected transaction flow of an application landscape as in FIGS. 3A-3C, according to an implementation.

FIG. 4 is a block diagram 400 illustrating a detected anomaly in an expected transaction flow of an application landscape (e.g., an application landscape 106) as in FIGS. 3A-3C, according to an implementation. For example, in FIG. 4, a computing node 104 has bypassed 303 the expected entry point of the application landscape 106 (here the end user monitor 302 (e.g., web application firewall 105)) and connected directly to another component internal to the application landscape 106 (e.g., computing node/application 304). Since the end user did not connect to the expected entry point of the application landscape 106, the detection/prevention functionality described at least in FIGS. 1A & 1B can be triggered.

Figure 5:
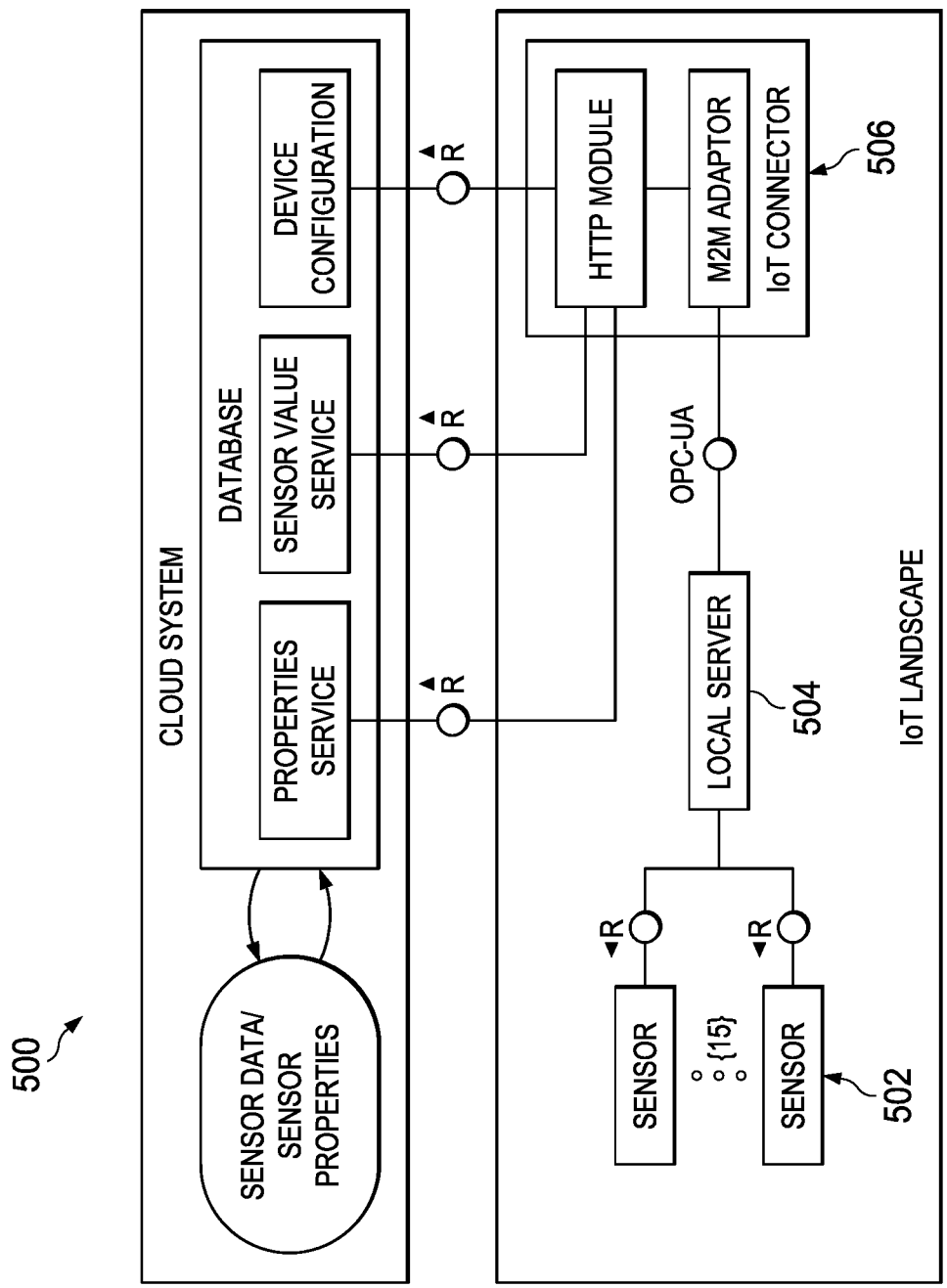
FIG. 5 is a block diagram of an example internet of things (IoT)-type example consistent with the described subject matter, according to an implementation.

FIG. 5 is a block diagram 500 of an example internet of things (IoT)-type example consistent with the described subject matter, according to an implementation. Data collection for security purposes (e.g., using a monitoring agent 102 as in FIGS. 1A & 1B) can be performed at the sensor 502, local server 504, or IoT connector 506 as an intruder would normally affect one of these points. In other implementations, data collection can be performed at any component illustrated in FIG. 5.

Figure 6:
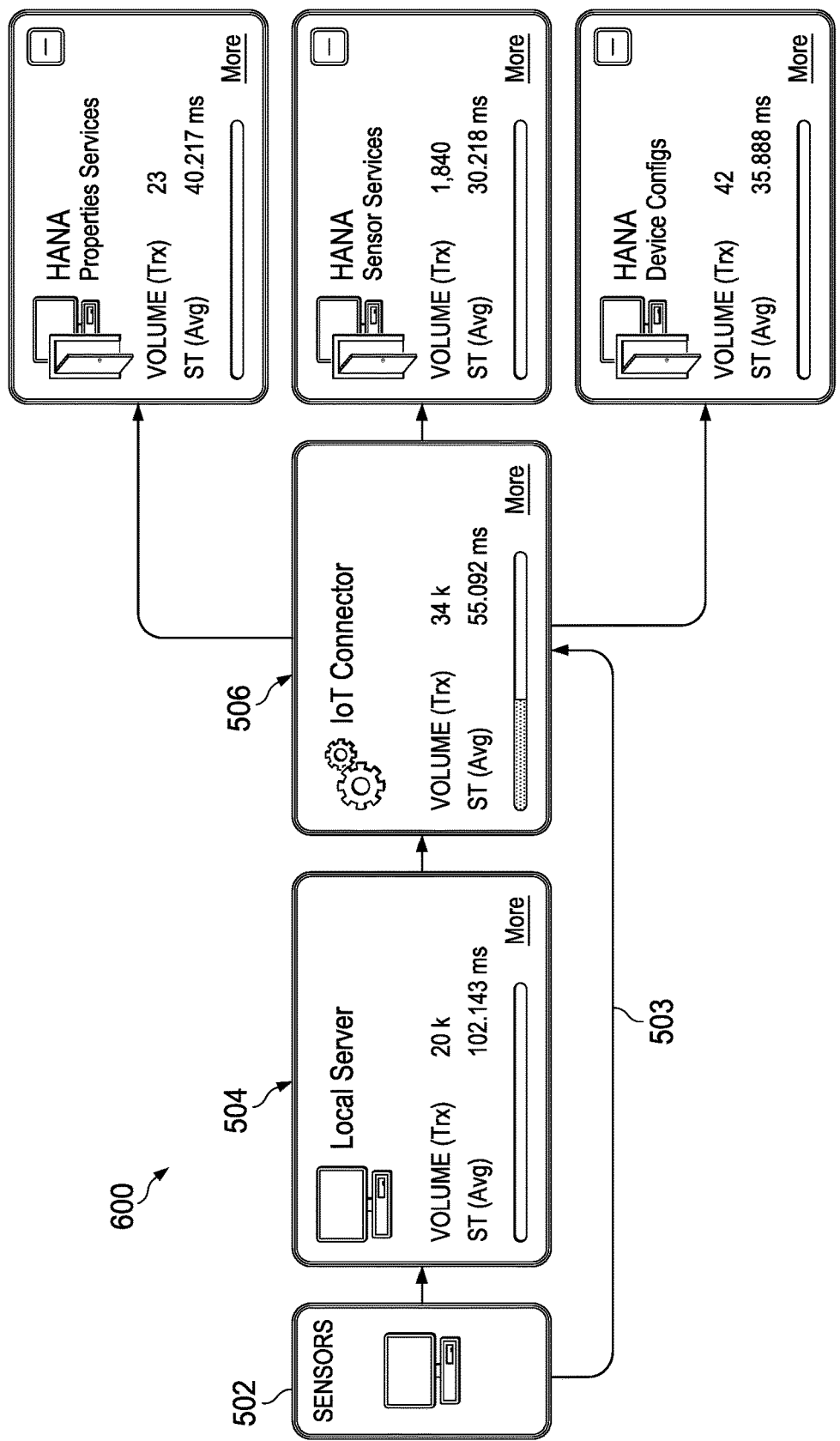
FIG. 6 is a block diagram illustrating a detected anomaly in an expected transaction flow as in FIGS. 3A-3C for an IoT-type application landscape, according to an implementation.

FIG. 6 is a block diagram illustrating a detected anomaly in an expected transaction flow 600 as in FIG. 3 for an internet of things (IoT) type application landscape (e.g., an application landscape 106), according to an implementation. For example, in FIG. 6, a sensor 502 has bypassed 503 the expected entry point of the application landscape 106 (here the local server 502) and connected directly to another component internal to the application landscape 106 (here the IoT connector 506). Since the end user did not connect to the expected entry point of the application landscape 106, the detection/prevention functionality described at least in FIGS. 1A & 1B can be triggered.

SSH Agent

Secure shell (SSH) sessions can used to access remote computing machines and are a normal method to attempt performing malicious activities on a remote computing machine. Malicious users able to login to a remote computing machine can, for example, switch credentials to other user's credentials and continue working on the machine or even connect to other computing machines using new SSH sessions. Currently tracking those flows is limited in the sense that a SSH session is encrypted and unless the SSH module associated with the session is configured to log verbatim what native commands are transmitted using the SSH session, there is really no way to know what the user may be doing on the remote machine. If a malicious user switches a user id within a particular SSH session, it makes tracking and correlating the session to its original user even more difficult. For example, a privileged user abusing their rights may actually turn off the logging facility or delete log files, making such tracking very difficult or next to impossible. In another example, correlating SSH sessions hopping between different hosts is also difficult and time consuming. While central monitoring of SSH sessions exists, the solutions typically rely on central control of SSH session keys which can also be abused. The disclosure also describes a way to monitor SSH sessions in contextual way, across user accounts and across hosts in a seamless manner that cannot (or at least it is very difficult to do so) be tampered with without the knowledge of the monitoring system.

Figure 7:
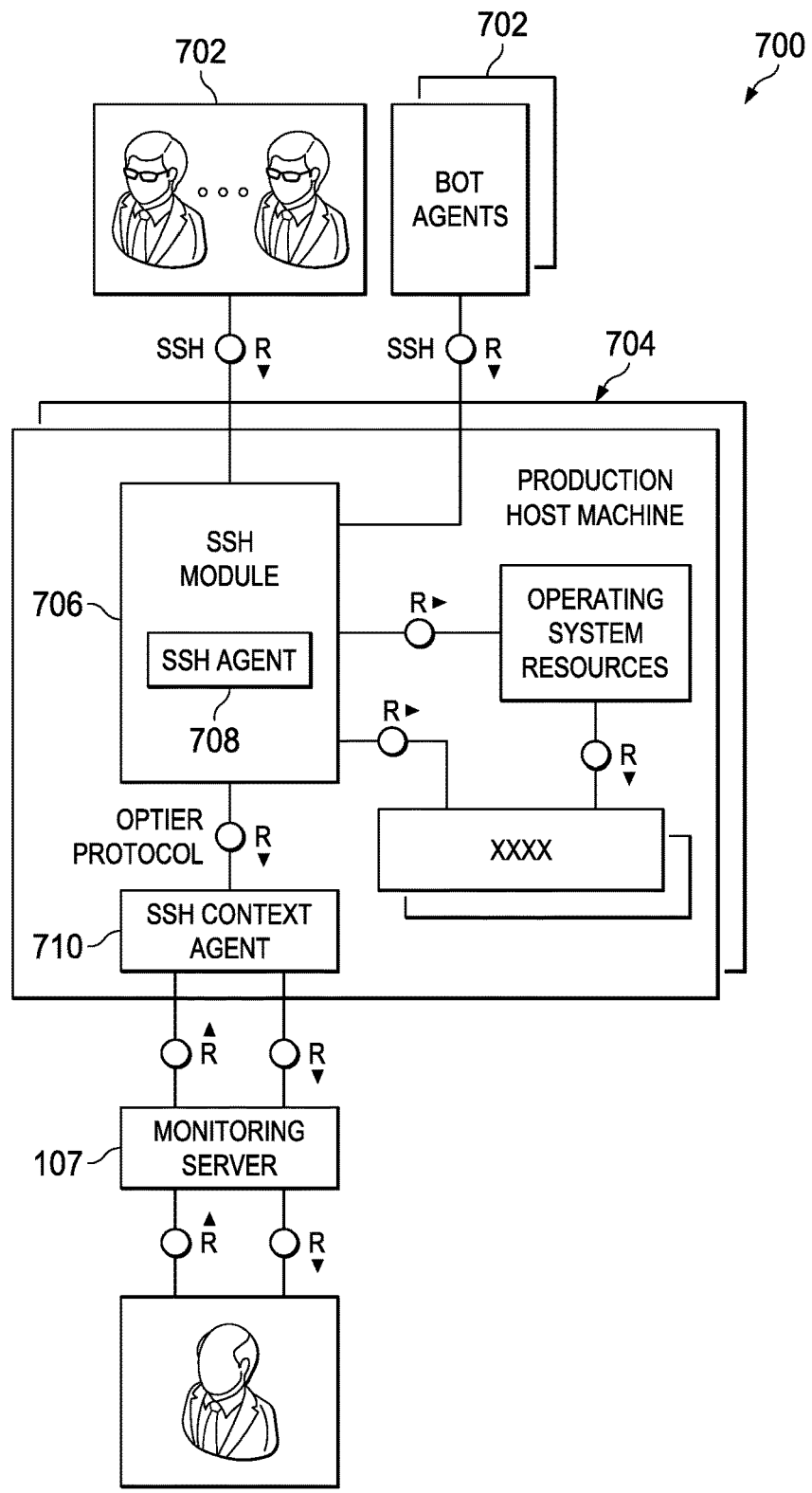
FIG. 7 is a block diagram illustrating integration of an SSH agent into an application landscape, according to an implementation.

FIG. 7 is a block diagram 700 illustrating integration of an SSH agent into an application landscape (e.g., an application landscape 106), according to an implementation. At a high level, the block diagram of FIG. 7 illustrates the main players in the scenario and location of an SSH agent 708. In typical implementations, users (e.g., humans, software Bots, etc.) 702 connect to a host 704 (e.g., a production host machine) using SSH protocol. Once the SSH module 706 of the host 704 accepts the SSH connection, it then handles the login/authentication and subsequent user commands. The subsequent user commands are then routed to various system resources.

As the communication between the user and the SSH server is encrypted, SSH agents 708 are placed in several key locations within the inner flow of the SSH module after decryption of the message. Therefore user encryption keys or certificates do not need to be managed. In typical implementations, an SSH module (e.g., SSH module 706) can be shipped out and installed already containing an SSH agent 708 by the manager of a data center which enhances overall data/operational security as it minimizes the ability to attempt to tamper with the initial SSH agent 708 installation, operation, configuration, etc. Any attempt to either ship out a host without installing the updated SSH module 706 can be detected by the monitoring server 107 since the missing module will not handshake with a monitoring server 107 configured to interface with one or more SSH modules (e.g., a lack of handshake alert can be generated) using known ports or in a proper format. If a different port is detected, an alert can be raised that anomalous behavior is occurring. Any attempt to disable the SSH agent 708 is monitored by the monitoring server 107 as it will stop receiving expected periodic handshakes. Any attempt to install another SSH agent on the fly (e.g., by a hacker, etc.), will result in the commands first being monitored by the SSH agent 708 as part of its communication between the SSH agent 708, SSH context agent 710, and the monitoring server 107. In typical implementations, the communication is UDP based, encrypted, and typically uses a proprietary protocol so it can't be read using a network sniffer or other hacking tools.

Data collected by the SSH agent 708 is transmitted to the SSH context agent 710 which handles classification of the data. The classified data is then sent to the monitoring server 107 for analysis and aggregation. The SSH agent 708 may be configured as to what parameters should be collected and reported to the SSH context agent 710. Typically, the configuration doesn't require a restart of the agent (again enhancing security).

At a lower-level:
1. The SSH library is instrumented with an internal customized C language Standard Development Kit (CSDK) SSH agent (SSH Agent 708). The SSH library package is typically compiled and deployed on Linux/Unix (or other) machines.
2. Once SSHD sessions are started, the CSDK SSH agent:
   a. Retains the notion of a SSH process running on "this" host in a persistent manner by reporting it to an external SSH context agent 710 which reports it to the monitoring server 107.
   b. Reports every incoming SSH session targeted to "this" host, reporting all the connecting party credentials and commands to the SSH context agent 710 and through it to the monitoring server 107.
   c. Upon user invoking any action in the session to switch user credentials (e.g., sudo su—XXX), the SSH agent 708 will pass inband a context to the next session being opened thus allowing correlation of the new SSH session to the original SSH session in a contextual manner by the monitoring server 107.
   d. For each session the SSH agent 708 reports key performance indicators (KPI)s such as start and end time, CPU and memory metrics, and the like.
   e. Subsequent commands invoked within the SSH session are handled by the CSDK which facilitates passing context inband (e.g., the ability to transfer a context inside the monitored communication protocol from one SSH session to the next. This is in contrast to passing context "outofband"—meaning the context is not passed within the monitored protocol but rather is passed by some other means between the different sessions). Example: running an HTTP command using SSH console session. The CSDK adds a context to the request. The server handling the request receives the context, thus the monitoring server 107 correlates the SSH invoked HTTP request and the HTTP server handling it.
3. All the information collected and reported by the SSH agent 708 is reported using SSH context agents supporting them as work units to the monitoring server 107.
4. The monitoring server 107 integrates for each SSH session its work units to a topology contextual entity (instance) retaining the topology and attributes and KPIs for each work unit and the whole instance as a whole.
5. The fact that the CSDK is compiled with in the SSH library means that anyone tampering with the library will break the SSH agent 708 which will immediately be noticed by the monitoring server 107 due to failure to maintain, for example, periodic handshakes. Thus, the solution provides a means to alert on an internal privileged user tampering with the SSH library.

In other implementations, similar to the above-described SSH implementation, other agents can be incorporated into an operating system (OS) to provide even lower, OS-level function monitoring functionality. This level of monitoring would provide additional protection from/alert to the presence of low-level hacking attacks to discover and take of advantage of OS exploits.

Figure 8:
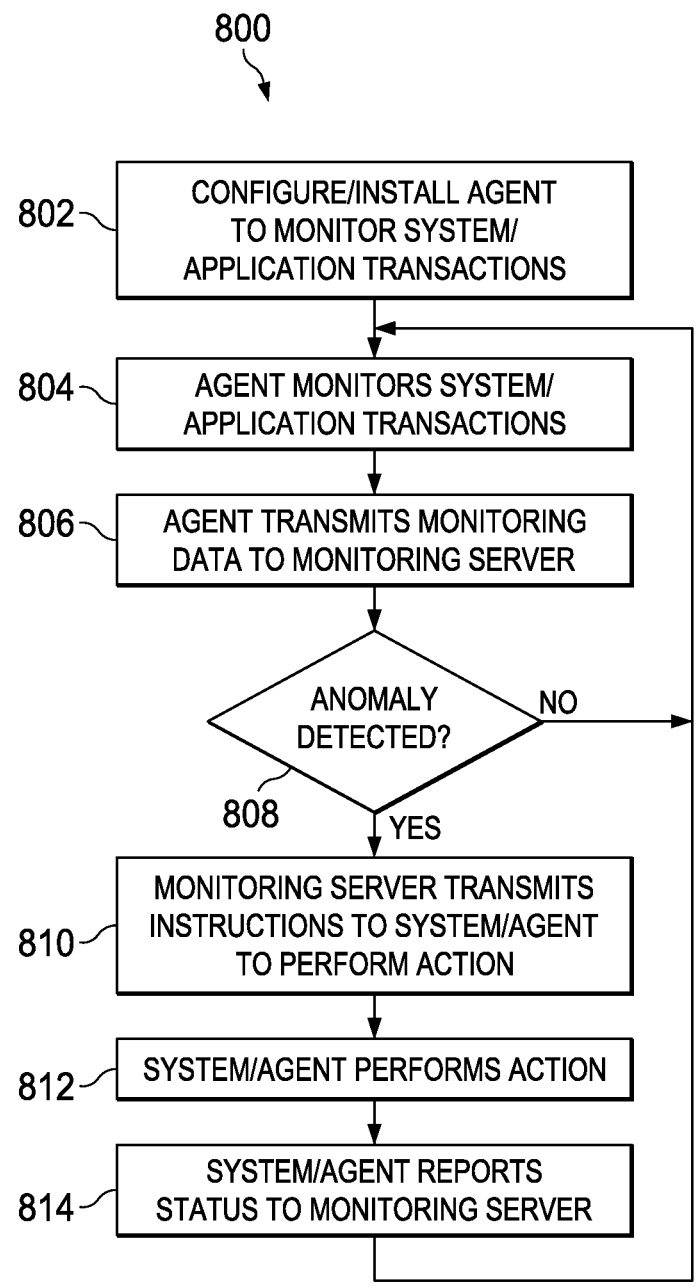
FIG. 8 is a flow chart of an example method for real-time contextual monitoring intrusion detection and prevention, according to an implementation.

FIG. 8 is a flow chart of an example method for real-time contextual monitoring intrusion detection and prevention, according to an implementation. For clarity of presentation, the description that follows generally describes method 800 in the context of FIGS. 1A & 1B and 2-9. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, and/or in any order.

At 802, a configuration is received for an agent associated with an application to monitor application transactions. In some implementations, the configuration can be received following either a push or pull operation. In some implementations, the configuration of the agent can be dynamically updated during application/agent runtime. In some implementations, the agent can be dynamically replaced or supplemented with a different agent with differing capabilities during runtime. In some implementations, agent configurations can include, among other things, instructions as to what type of transactions to monitor, monitoring frequency, monitoring rules, default actions, alert parameters, error procedures, communication details (e.g., security, which other agents/components of the CIDS to communicate with, etc.), and the like. As will be appreciated by those of ordinary skill in the art, agent configurations can include many other configuration options consistent with this disclosure. The provided examples are not meant to limit possible agent configurations in any way. From 802, method 800 proceeds to 804.

At 804, incoming and outgoing application transactions are monitored using the agent. In typical implementations, agent code is inserted and compiled into the application code as part of the application so that the agent "sees" transactions from the point of view of the application and not from a removed position. In some implementations, the transactions are performed using the secure shell (SSH) protocol. From 804, method 800 proceeds to 806.

At 806, monitored transaction data is transmitted to a monitoring server for anomalous transaction detection. From 806, method 800 proceeds to 808.

At 808, a determination is made whether anomalous transactions have been detected. In some implementations, the anomalous transaction detection is performed using a learning machine using behavior models continuously updated by learning machine determinations. If an anomalous transaction has not been detected, method 800 proceeds back to 804 to continue monitoring of incoming and outgoing application transactions. If an anomalous transaction has been detected, method 800 proceeds to 810.

At 810, instructions from the monitoring server are received to perform an action based on the transmitted monitored transaction data. Actions can include, among others, those identified above—rerouting transactions, blocking transactions, etc. From 810, method 800 proceeds to 812.

At 812, the receiving system/agent performs an action based on the received instructions. In some implementations, actions can include those performed by the agent as well as triggering other agents/systems to perform actions. From 812, method 800 proceeds to 814. At 814, the system/agent reports a status of the performed action to the monitoring server to ensure the actions have been completed. If necessary, the monitoring server can request further actions or trigger other systems/agents to perform actions. After 814, method 800 proceeds back to 804.

Figure 9:
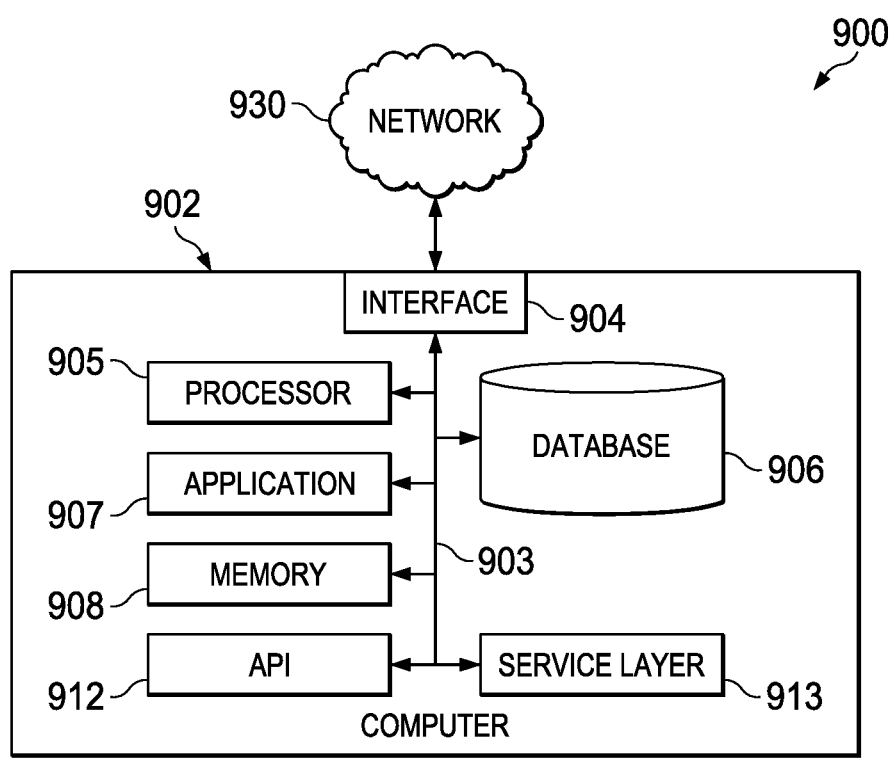
FIG. 9 is a block diagram of a CIDS, according to an implementation.

FIG. 9 is a block diagram 900 of an exemplary computer 902 used in a CIDS, according to an implementation. As will be appreciated by those of ordinary skill in the art, the described computer and configuration is only one possible configuration to provide understanding and context for the describe subject matter and should be taken as limiting the scope of the disclosure.

The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 902 may comprise a computer that includes an input device, such as a keypad, keyboard, touch screen, or other device that can accept user information, and an output device that conveys information associated with the operation of the computer 902, including digital data, visual and/or audio information, or a GUI.

The computer 902 can process for/serve as a client, a server, and/or any other component of the described CIDS (whether or not illustrated). The illustrated computer 902 is communicably coupled with a network 930. In some implementations, one or more components of the computer 902 may be configured to operate within a cloud-computing-based or distributed type computing environment.

At a high level, the computer 902 is an electronic computing device operable to receive, transmit, process, store, or manage data and information associated with the CIDS. According to some implementations, the computer 902 may also include or be communicably coupled with a cloud-computing server, application server, e-mail server, web server, caching server, streaming data server, business intelligence (BI) server, and/or other server.

The computer 902 can generate requests to transmit over network 930 (e.g., as a client or server) or receive requests (e.g., as a server) over network 930 from a client application (e.g., a web browser or other application) and responding to the received requests by processing the said requests in an appropriate software application, hardware, etc. In addition, requests may also be sent to the computer 902 from internal users (e.g., from a command console or by other appropriate access method), external or third-parties, other automated applications, as well as any other appropriate entities, individuals, systems, or computers.

Each of the components of the computer 902 can communicate using a system bus 903. In some implementations, any and/or all the components of the computer 902, both hardware and/or software, may interface with each other over the system bus 903 using an API 912 and/or a service layer 913. The API 912 may include specifications for routines, data structures, and object classes. The API 912 may be either computer-language independent or dependent and refer to a complete interface, a single function, or even a set of APIs. The service layer 913 provides software services to the computer 902 and/or the CIDS. The functionality of the computer 902 may be accessible for all service consumers using this service layer. Software services, such as those provided by the service layer 913, provide reusable, defined business functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 and/or the service layer 913 as stand-alone components in relation to other components of the computer 902 and/or CIDS. Moreover, any or all parts of the API 912 and/or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902 and/or CIDS. The interface 904 is used by the computer 902 for communicating with other systems in a distributed environment—including within the CIDS—connected to the network 930 (whether illustrated or not). Generally, the interface 904 comprises logic encoded in software and/or hardware in a suitable combination and operable to communicate with the network 930. More specifically, the interface 904 may comprise software supporting one or more communication protocols associated with communications such that the network 930 or interface's hardware is operable to communicate physical signals within and outside of the CIDS.

The computer 902 includes a processor 905. Although illustrated as a single processor 905 in FIG. 9, two or more processors may be used according to particular needs, desires, or particular implementations of the computer 902 and/or the CIDS. Generally, the processor 905 executes instructions and manipulates data to perform the operations of the computer 902. Specifically, the processor 905 executes the functionality required for real-time contextual monitoring intrusion detection and prevention.

The computer 902 also includes a database 906 and memory 908 that hold data for the computer 902 and/or other components of the CIDS. Although illustrated as a single database 906 and memory 908 in FIG. 9, two or more databases 908 and memories 908 may be used according to particular needs, desires, or particular implementations of the computer 902 and/or the CIDS. While database 908 and memory 908 are illustrated as integral components of the computer 902, in alternative implementations, the database 906 and memory 908 can be external to the computer 902 and/or the CIDS. In some implementations, the database can be a conventional database or an in-memory database, or a mix of both. In some implementations, the database 906 and memory 908 can be combined into one component.

The application 907 is an algorithmic software engine providing functionality according to particular needs, desires, or particular implementations of the computer 902 and/or the CIDS, particularly with respect to functionalities required for real-time contextual monitoring intrusion detection and prevention. Further, although illustrated as a single application 907, the application 907 may be implemented as multiple applications 907 on the computer 902. In addition, although illustrated as integral to the computer 902, in alternative implementations, the application 907 can be external to the computer 902 and/or the CIDS.

There may be any number of computers 902 associated with, or external to, the CIDS and communicating over network 930. Further, the term "client," "user," and other appropriate terminology may be used interchangeably as appropriate without departing from the scope of this disclosure. Moreover, this disclosure contemplates that many users may use one computer 902, or that one user may use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and/or parallel processing may be advantageous and performed as deemed appropriate.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:
1. A computer-implemented method, comprising:
executing a secure shell (SSH) module as part of a host computing machine, wherein code for an SSH agent is integrated with code of the SSH module;

collecting incoming and outgoing host computing machine transactions using the SSH agent;

storing, in an active context tracking persistence, the collected incoming and outgoing host computing machine transactions;

identifying and storing, in the active context tracking persistence, context information for each of the incoming and outgoing host computing machine transactions, wherein the context information includes, for the respective host computing machine transaction, a name of a user, a geographic location of the user, a browser used by the user, a device used by the user, and an application used by the user, wherein the context information identifies an action in a session invoked by the user to switch user credentials;

transmitting the collected incoming and outgoing host computing machine transactions and the stored contexts to an SSH context agent external to the SSH module;

transmitting the collected incoming and outgoing host computing machine transactions and the stored contexts to a monitoring server for anomalous transaction detection;

receiving instructions from the monitoring server to perform an action based on an anomalous transaction detection due to the collected incoming and outgoing host computing machine transactions and the context information; and performing the action based on the received instructions.

2. The method of claim 1, comprising compiling the SSH module with the integrated code of the SSH agent.

3. The method of claim 1, wherein the SSH context agent performs classification of the received collected incoming and outgoing host computing machine transactions.

4. The method of claim 1, wherein the SSH agent is configured as to what parameters of incoming and outgoing host computing machine transactions are to be collected and reported to the SSH context agent.

5. The method of claim 1, comprising monitoring periodic handshakes between the monitoring server and the SSH agent.

6. The method of claim 1, comprising detecting an anomalous transaction in the collected incoming and outgoing host computing machine transactions.

7. The method of claim 1, wherein the anomalous transaction detection is performed using a learning machine using behavior models continuously updated by learning machine determinations.

8. The computer-implemented system of claim 1, wherein the action is an action to block transactions of the user based on the context information identifying the action in the session invoked by the user to switch user credentials.

9. A non-transitory, computer-readable medium storing computer-readable instructions, the instructions executable by a computer and configured to:

execute a secure shell (SSH) module as part of a host computing machine, wherein code for an SSH agent is integrated with code of the SSH module;

collect incoming and outgoing host computing machine transactions using the SSH agent;

storing, in an active context tracking persistence, the collected incoming and outgoing host computing machine transactions;

identifying and storing, in the active context tracking persistence, context information for each of the incoming and outgoing host computing machine transactions, wherein the context information includes, for the respective host computing machine transaction, a name of a user, a geographic location of the user, a browser used by the user, a device used by the user, and an application used by the user, wherein the context information identifies an action in the session invoked by the user to switch user credentials;

transmit the collected incoming and outgoing host computing machine transactions and the stored contexts to an SSH context agent external to the SSH module;

transmit the collected incoming and outgoing host computing machine transactions and the stored contexts to a monitoring server for anomalous transaction detection;

receive instructions from the monitoring server to perform an action based on an anomalous transaction detection due to the collected incoming and outgoing host computing machine transactions and the context information; and perform the action based on the received instructions.

10. The non-transitory, computer-readable medium of claim 9, comprising instructions to compile the SSH module with the integrated code of the SSH agent.

11. The non-transitory, computer-readable medium of claim 9, wherein the SSH context agent performs classification of the received collected incoming and outgoing host computing machine transactions.

12. The non-transitory, computer-readable medium of claim 9, wherein the SSH agent is configured as to what parameters of incoming and outgoing host computing machine transactions are to be collected and reported to the SSH context agent.

13. The non-transitory, computer-readable medium of claim 9, comprising instructions to monitor periodic handshakes between the monitoring server and the SSH agent.

14. The non-transitory, computer-readable medium of claim 9, comprising instructions to detect an anomalous transaction in the collected incoming and outgoing host computing machine transactions.

15. The non-transitory, computer-readable medium of claim 9, wherein the anomalous transaction detection is performed using a learning machine using behavior models continuously updated by learning machine determinations.

16. A computer-implemented system, comprising:
at least one hardware processor interoperably coupled with a computer memory and configured to:
execute a secure shell (SSH) module as part of a host computing machine, wherein code for an SSH agent is integrated with code of the SSH module;
collect incoming and outgoing host computing machine transactions using the SSH agent;
store, in an active context tracking persistence, the collected incoming and outgoing host computing machine transactions;
identify and store, in the active context tracking persistence, context information for each of the incoming and outgoing host computing machine transactions, wherein the context information includes, for the respective host computing machine transaction, a name of a user, a geographic location of the user, a browser used by the user, a device used by the user, and an application used by the user, wherein the context information identifies an action in a session invoked by the user to switch user credentials;
transmit the collected incoming and outgoing host computing machine transactions and the stored contexts to an SSH context agent external to the SSH module;

transmit the collected incoming and outgoing host computing machine transactions and the stored contexts to a monitoring server for anomalous transaction detection;

receive instructions from the monitoring server to perform an action based on an anomalous transaction detection due to the collected incoming and outgoing host computing machine transactions and the context information; and perform the action based on the received instructions.

17. The computer-implemented system of claim 16, configured to compile the SSH module with the integrated code of the SSH agent.

18. The computer-implemented system of claim 16, wherein the SSH context agent performs classification of the received collected incoming and outgoing host computing machine transactions.

19. The computer-implemented system of claim 16, wherein the SSH agent is configured as to what parameters of incoming and outgoing host computing machine transactions are to be collected and reported to the SSH context agent.

20. The computer-implemented system of claim 16, configured to monitor periodic handshakes between the monitoring server and the SSH agent.

21. The computer-implemented system of claim 16, configured to detect an anomalous transaction in the collected incoming and outgoing host computing machine transactions, wherein the anomalous transaction detection is performed using a learning machine using behavior models continuously updated by learning machine determinations.

* * * * *